United States Patent [19]

Harloff

[11] 4,130,872

[45] Dec. 19, 1978

[54] METHOD AND SYSTEM OF CONTROLLING A JET ENGINE FOR AVOIDING ENGINE SURGE

[75] Inventor: Gary J. Harloff, Irving, Tex.

[73] Assignee: The United States of America as represented by the Secretary of the Air Force, Washington, D.C.

[21] Appl. No.: 621,326

[22] Filed: Oct. 10, 1975

[51] Int. Cl.² .......................................... G01M 15/00
[52] U.S. Cl. ................................. 364/431; 60/39.29; 73/117.4; 364/426
[58] Field of Search ............ 235/150.2; 73/116, 117.4; 60/39.27, 39.29, 227; 364/426, 431

[56] References Cited

U.S. PATENT DOCUMENTS

| 2,941,399 | 6/1960 | Bersinger | 73/117.4 |
| 3,533,238 | 10/1970 | Marvin | 60/39.29 |
| 3,835,701 | 9/1974 | Murphy et al. | 235/150.2 |
| 3,886,790 | 6/1975 | Plett | 73/117.4 |

Primary Examiner—Charles E. Atkinson
Assistant Examiner—Errol A. Krass
Attorney, Agent, or Firm—Joseph E. Rusz; Julian L. Siegel

[57] ABSTRACT

A jet engine is controlled by placing time variant total pressure probes at the entry plane and the discharge plane of a jet engine fan. The pressure values at the probes are converted into electrical signals, filtered, and then fed to meters where the root-mean-square (RMS) values of the electrical signals are determined. The RMS values are fed to a computer which computes the ratio of the two RMS values and this ratio is fed to a comparison circuit which generates a difference signal representing the difference between the RMS ratio and a predetermined limit value. If the RMS ratio equals the limit value, then the operating point of a fan is altered by either changing the nozzle area, changing the fan speed, or changing the altitude or Mach number.

7 Claims, 6 Drawing Figures

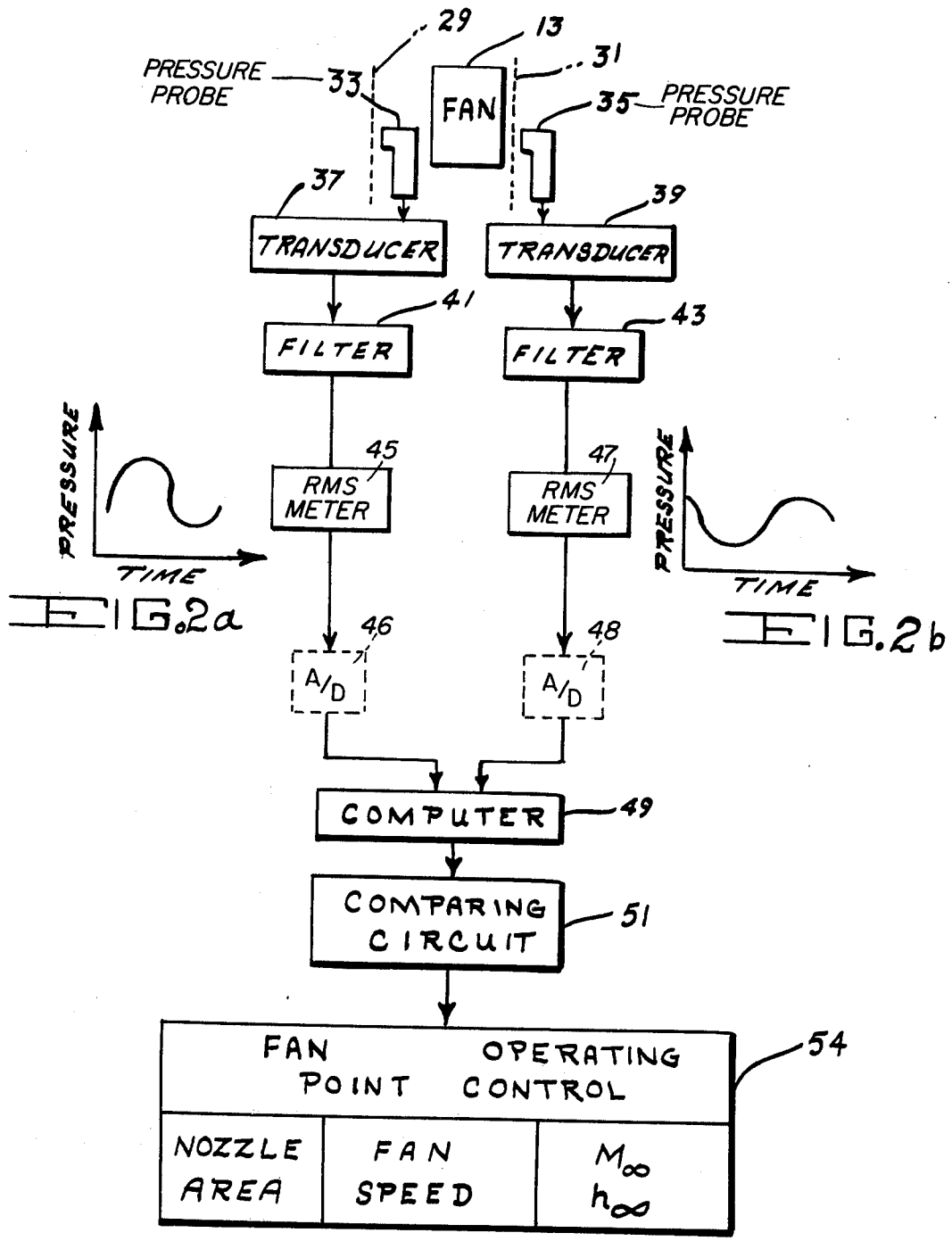

METHOD AND SYSTEM OF CONTROLLING A JET ENGINE FOR AVOIDING ENGINE SURGE

STATEMENT OF GOVERNMENT INTEREST

The invention described herein may be manufactured and used by or for the Government for governmental purposes without the payment of any royalty thereon.

BACKGROUND OF THE INVENTION

This invention relates to jet engines, and more particularly, to the control of operating points of the jet engine fan for controlling surges.

There is a need in the field of jet engines to be able to regulate and control the operating point of the jet engine fan to avoid surge. One important value of this control is that of safety. A jet engine may experience a loss in performance during engine surge which could result in a crash. Also, such control improves the reliability of the jet engine.

The present invention provides the above need by offering a system of continuous monitoring of the fan pressures in two locations and regulating certain parameters in accordance with a comparison of these pressures with a predetermined level.

SUMMARY OF THE INVENTION

The present invention is a system for calculating and monitoring a ratio of RMS amplitudes across the fan of a jet engine and only requires considering the data within a small frequency range. Time variant total pressure probes are used to detect the amplitude of the fluctuating total pressures. The output electrical signals are filtered and RMS values are determined. When the ratio of the discharge to the entry RMS amplitudes equals a predetermined level, the operating point of the fan is altered and/or the flight altitude and Mach number are changed. The use of pressure ratios across the fan indicates incipient surge and by changing the operating point of the fan such a surge can be prevented.

It is therefore an object of this invention to provide a method and system of monitoring the performance of a jet engine.

It is another object to provide a system for improving the reliability of jet engines.

It is still another object to provide a system of avoiding loss in performance during engine surge and possible aircraft crash.

It is still another object to provide another method and system of controlling the operating point of a jet engine fan by monitoring the amplitude of RMS pressure ratios requiring only a small frequency range.

These and other objects, features and advantages of the invention will become more apparent from the following description taken in conjunction with the illustrative embodiment in the accompanying drawings in which like reference numerals identify like elements in the several figures.

DESCRIPTION OF THE DRAWINGS

FIG. 2 is a block diagram showing an embodiment of the invention;

FIG. 2a is a graph showing the pressure versus time relationship at one position of a pressure probe;

FIG. 2b is a graph showing the pressure versus time relationship at a second position of a pressure probe;

DETAILED DESCRIPTION OF THE PREFERRED EMBODIMENT

Figure 1:
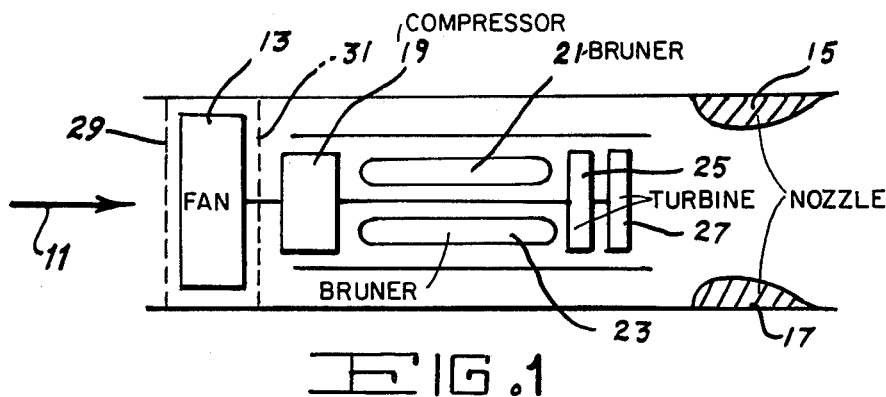
FIG. 1 is a schematic diagram of a jet engine showing the relationship of the pressure probes.

The present invention controls the operating point of a fan of a jet engine by monitoring the pressure about the fan at given points. Referring to FIG. 1, there is shown a schematic of a jet engine. The flow of air, as shown by arrow 11, passes from the left side of the diagram where fan 13 is located through to the right side and to nozzles 15 and 17. A portion of the air passes fan 13 and out through nozzles 15 and 17. The remaining air passes high pressure compressor 19 and is heated by burners 21 and 23. The heated air then passes through turbines 25 and 27 and out through the area between nozzles 15 and 17. Dotted line 29 represents the entry plane and dotted line 31 represents the discharge plane of fan 13. At planes 29 and 31 are placed the time variant pressure probes.

Referring to FIG. 2, there is shown a block diagram of an embodiment of the invention wherein time variant total pressure probes 33 and 35 are placed at entry plane 29 and discharge plane 31 of fan 13. These probes detect changes in pressure and the pressure changes are converted to electrical signals by pressure-to-electrical transducers 37 and 39. Time variant pressure probes and pressure to electrical transducers are well known in the art and have been in use since the late 1960's. See, for example, "A Study of Inlet/Engine Interaction in a Transonic Propulsion Wind Tunnel", page 40, by M. B. Sussman et al, Boeing Report D6-60116, January 1970. One source of the pressure to electrical transducers is Kulite Semiconductor Products, Inc., 1039 Hoyt Avenue, Ridgefield, N.J. The output of transducers 37 and 39 are fed to filters 41 and 43 to eliminate any random electrical signals. These filters are readily available from manufacturers such as Aladdin Electronics, Nashville, Tenn. The output of filter 41 representing the pressure changes at entry plane 29 of fan 13 is shown in FIG. 2a which is a plot of pressure versus time. Similarly the output of filter 43 representing the pressure changes at discharge plane 31 of fan 13 is shown in FIG. 2b.

Figure 3:
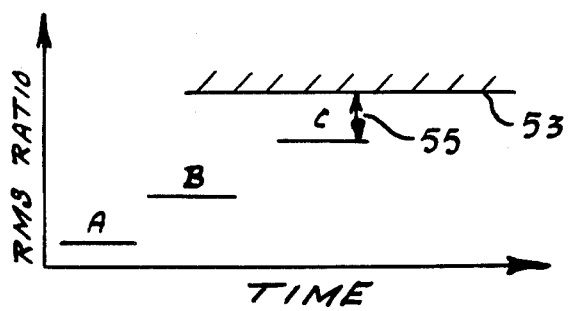
FIG. 3 is a graph showing a plot of ratios of RMS values versus time with this relationship compared to a limit value.

Returning to FIG. 2, root-mean-squared (RMS) meters 45 and 47 measure the amplitudes of the outputs of filters 41 and 43 and feed the results to computer 49 which computes the ratio of the RMS value from meter 47 to the RMS value from meter 45. These RMS meters are readily available from manufacturers such as the DISA Company. If computer 49 is an analog computer, it can receive values directly from RMS meters 45 and 47 which are customarily analog devices. However, computer 49 can be alternatively a digital computer which would then require a pair of analog-to-digital converters 46 and 48 interposed one each between RMS meters 45 and 47 and computer 49. These analog-to-digital converters are available from many manufacturers; as an example, from Beckman Instruments, Fullerton, Calif. A limit value of the ratio of the two RMS values is predetermined and is a function of the flight altitude ($h_\infty$) and the Mach number ($M_\infty$). This limit value is compared with the ratio of the two RMS values in a threshold or comparing circuit 51. If computer 49 is a digital computer the comparing circuit 51 will not be needed as the digital computer will compare the ratio of the two RMS values with the limit value. These relationships are shown in FIG. 3 which is a plot of various RMS ratios designated as A, B and C, and they are plotted against time. The top line 53 represents the limit value for a given $M_\infty$, $h_\infty$, and arrow 55 represents the difference between RMS ratio C and limit value 53. When the computed RMS ratio equals the limit value, the operating point of the fan is changed, as is described below.

Figure 4:
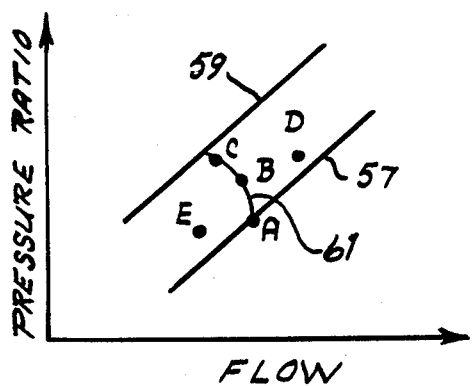
FIG. 4 is a graph showing plots of pressure ratio versus flow which is equivalent to a fan map.

Returning to FIG. 2, the output of circuit 51 is fed to control 54 for altering the operating point of the fan. The fan operating point can be changed in three manners, i.e., by changing the nozzle area of the jet engine, changing the fan speed, and changing the flight altitude $h_\infty$ and the Mach number $M_\infty$. Changing one (or more) of the above three items is dependent on the other two. The means for controlling the nozzle area, fan speed, flight mach number and flight altitude are well known in presently used jet control systems; as for example, the F100 and F401 jet engines. These means have been used for many years by the large jet engine manufacturers. Changing the operating point of the fan is shown schematically in FIG. 4 which is a fan map showing the relationship of pressure ratio to flow. Line 57 is the steady-state clean operating line and line 59 is the clean surge line. Line 61 is a line of constant speed. The points A, B, C, D and E are possible operating points. Point C denotes a point near surge and by altering the nozzle area, or the fan speed, or $M_\infty$ and $h_\infty$, the operating point of a fan can be changed from point C to point D, point E, point B, or point A.

All of the elements of this invention are well known in the art and are readily available usually as off-the-shelf items.

What is claimed is:

1. A system for automatically avoiding a surge of a jet engine having a fan with an entry plane and a discharge plane, comprising:
   a. a first time variant total pressure probe positioned at the entry plane of the jet engine fan;
   b. a second time variant total pressure probe positioned at the discharge plane of the jet engine fan;
   c. first and second means for converting responses of the first and second pressure probes respectively into corresponding electrical signals;
   d. first and second RMS meters fed respectively by the first and second converting means;
   e. a computer fed by the first and second RMS meters for determining the ratio of the outputs of second RMS meter to the first RMS meter;
   f. a threshold circuit fed by the computer wherein the ratio of the outputs of the first and second RMS meters is compared with a predetermined limit value; and
   g. means for controlling the operating point of the fan.

2. A system for automatically avoiding a surge of a jet engine according to claim 1 wherein the first and second converting means are pressure-to-electrical transducers.

3. A system for automatically avoiding a surge of a jet engine according to claim 2 which further comprises first and second filters interposed between the first and second pressure-to-electrical transducers and the first and second RMS meters respectively.

4. A system for automatically avoiding a surge of a jet engine according to claim 3 which further comprises first and second analog-to-digital converters interposed one each between the computer and the first and second RMS meters respectively, and wherein the computer is a digital computer.

5. A system for automatically avoiding a surge of a jet engine according to claim 3 wherein the means for controlling the operating point of the fan is a means for controlling the nozzle area of the jet engine.

6. A system for automatically avoiding a surge of a jet engine according to claim 3 wherein the means for controlling the operating point of the fan is a means for controlling the speed thereof.

7. A system for automatically avoiding a surge of a jet engine according to claim 3 wherein the means for controlling the operating point of the fan is a means for controlling the flight altitude and Mach number.

* * * * *

UNITED STATES PATENT AND TRADEMARK OFFICE
CERTIFICATE OF CORRECTION

PATENT NO. : 4,130,872
DATED : Dec. 19, 1978
INVENTOR(S) : Gary J. Harloff

It is certified that error appears in the above-identified patent and that said Letters Patent are hereby corrected as shown below:

In Figure 1, the word "BRUNER" (2 Occurrences)

should read --BURNER-- (both occurrences)

Signed and Sealed this

First Day of May 1979

[SEAL]

Attest:

RUTH C. MASON
Attesting Officer

DONALD W. BANNER
Commissioner of Patents and Trademarks